United States Patent [19]

Clauson et al.

[11] Patent Number: 4,578,316

[45] Date of Patent: Mar. 25, 1986

[54] MULTI-LAYER ORIENTED POLYPROPYLENE FILMS WITH LOW COF SKIN(S)

[75] Inventors: Melvil B. Clauson, Newark; John R. Wagner, Jr., Rochester, both of N.Y.

[73] Assignee: Mobil Oil Corporation, New York, N.Y.

[21] Appl. No.: 683,781

[22] Filed: Dec. 19, 1984

[51] Int. Cl.[4] .............................................. B32B 27/08
[52] U.S. Cl. ............................. 428/516; 156/244.11; 428/35; 428/349; 525/240
[58] Field of Search ............... 525/240; 428/349, 516, 428/515, 35; 156/244.11

[56] References Cited

U.S. PATENT DOCUMENTS

| | | | |
|---|---|---|---|
| 4,221,882 | 9/1980 | Huff | 525/240 |
| 4,339,494 | 7/1982 | Weiner | 525/240 |
| 4,366,292 | 12/1982 | Werner et al. | 525/240 |
| 4,390,385 | 6/1983 | Ferguson | 525/240 |
| 4,419,411 | 12/1983 | Park | 525/240 |

Primary Examiner—Edith Buffalow
Attorney, Agent, or Firm—Alexander J. McKillop; Michael G. Gilman; James P. O'Sullivan

[57] ABSTRACT

An oriented film structure comprising a polypropylene film having on at least one surface thereof a layer of a blend of (I) a member selected from the group consisting of a medium density polyethylene, a high density polyethylene and mixtures thereof and (II) polypropylene.

10 Claims, No Drawings

MULTI-LAYER ORIENTED POLYPROPYLENE FILMS WITH LOW COF SKIN(S)

BACKGROUND OF THE INVENTION

The invention relates to a multi-layer polypropylene film structure having comparatively low film to film coefficient of friction.

Highly crystalline polypropylene film is an excellent packaging material, but it has a high film to film coefficient of friction which makes it difficult or impossible for it to be successfully utilized in automatic packaging equipment. The film will not respond to the packaging speed capability of the system and, as a consequence, jamming results. This material in film form also has a tendency to stick at heat seal surfaces, such as, in packages requiring hot crimp seals. Thus, it is impossible to employ this material in standard commercially available horizontal or vertical form and fill packaging systems without first modifying the polypropylene film so that it can be handled at practicle packaging speeds.

In the past, the coefficient of friction characteristics of polypropylene and other thermoplastic films have been benefically modified by the inclusion in the polymer of coefficient of friction (COF) additives such as, for example, fatty acid amides. The effectiveness of an amide depends upon its ability to migrate to the surface of the films in order to reduce COF. While such amides do improve the COF of the films, the value of the COF is subject to wide variation depending upon the heat history which the film experiences during storage, shipping, and certain converting processes. The presence of such amides on the film surfaces can adversely affect the film's appearance as manifested by an increase in haze, a decrease in gloss and the presence of streaks. The presence of such amides on the surface can also adversely affect the wettability and adhesion of solvent and water base inks, coatings and adhesives.

It is an object of the present invention to provide a multilayer polypropylene film having a comparatively low coefficient of friction, as compared with the unmodified film, without the use of prior art COF additives or anti-block agents.

It is yet another object of the present invention to provide a film having improved COF characteristics which are stable with regard to the heat history of the film.

It is a further object of the present invention to provide a film having improved COF characteristics without the adverse affects on appearance, wetting and adhesion typically experienced with additive-modified films.

SUMMARY OF THE INVENTION

It has been discovered that fatty acid amide and other COF type improvers can be excluded from the contemplated film structures of the present invention.

According to the present invention, there is provided an oriented film structure comprising polypropylene film having on at least one surface thereof a layer of a blend of (I) a member selected from the group consisting of a medium density (MDPE), a high density polyethylene (HDPE) and mixtures thereof and (II) polypropylene.

The present invention also is directed to a process for preparing the oriented film structure comprising: applying to at least one surface of a polypropylene film, a layer of the blend of (I) and (II) as defined above, bringing the combination to a stretch-orientable condition and stretching it in at least one direction. It is preferred that the blend layer is applied to the polypropylene film during coextrusion through a die followed by cooling prior to biaxial orientation.

DETAILED DESCRIPTION OF THE INVENTION

The present invention is broadly directed to the presentation of an improved surface material on a core layer which is highly crystalline or highly stereoregular polypropylene in oriented film form. The preferred polypropylenes of the core layer are well known in the art and are formed by polymerizing polypropylene in the presence of stereospecific catalyst systems. These polypropylenes can have a melt flow rate at 446° F. ranging from about 1 to about 25, preferably 2 to 8. The crystalline melting point of these materials is about 321°–336° F. The number average molecular weight ranges from about 25,000 to about 100,000. The density ranges from about 0.90–0.91.

The comparatively low COF surface layer applied to the core or substrate polypropylene layer is formed from a blend of polypropylene and either a medium density polyethylene, a high density polyethylene or a mixture of the medium and high density polyethylene. The contemplated medium or high density polyethylene can be produced by a number of different processes, but in all cases the pressures and temperatures are much lower than those required by a low density polyethylene process. The American Society for Testing and Materials types polyethylenes as follows: Type 1 is low density polyethylene and can be considered to have a density ranging from about 0.910 to 0.925; Type 2 is medium density polyethylene and it ranges from about 0.926–0.940; and Type 3 is high density polyethylene with a density of from 0.941 to 0.960. This is consistent with the classification given in Modern Encyclopedia, 1983–1984, Volume 60, No. 10A, page 57. For purposes of the present invention the high density should be extended up to 0.965. These materials, i.e. medium and high density PE, should have a melt index of from about 0.2 to about 5. These low pressure or high density polyethylenes are well known in the art and have very different properties from low density polyethylenes. They are prepared by reacting ethylene monomer in the presence of a metallic oxide catalyst. The medium and high density polyethylenes so produced may be linear, or may contain controlled amounts of branching. These polyethylenes are to be distinguished from high density, high molecular weight polyethylenes having a weight average molecular weight of above about one-half million. The contemplated medium and high density polyethylenes are commercially available from several sources.

The exterior skin layers are fabricated from a physical blend of the medium or high density polyethylene or mixtures thereof and polypropylene. The polypropylene employed can be identical to the polypropylene employed for the core layer. The two materials can be blended in a percent by weight of from about 2% by weight to about 60% by weight of the medium or high density polyethylene with the remainder being the polypropylene. The physical blend can be accomplished by any means which will form a uniform blend of the two components. The components can be premixed as solid dry granules and later melt blended for subsequent extrusion as skin layers on the core material. Alternatively, the material may be melt blended first, cooled and subdivided, and thus, be ready for use as a preformed material.

In the following examples, the polypropylene employed as the core material and also as the material blended with the linear low density copolymer is identified as an isotactic polypropylene, i.e., ARCO W472 available from ARCO Corp. Its melt flow range is 4-5 and it contains no slip or antiblock additives. The medium density polyethylene (MDPE) employed in the Example and Table 1 is TR 130, having a Melt Index of 0.3 and a density of 0.937. It is available from Phillips Chemical, Bartlesville, Okla. It contains no slip or antiblock additives.

The films formed according to the following example, as representative of the present invention, have a core of polypropylene and the defined skin layer blends on both sides thereof. It is understood, however, that structures with but a single skin of the subject blend may also be formed.

EXAMPLE

Polypropylene homopolymer, as hereinabove defined, was fed into the feed hopper of a conventional rotating screw extruder. The extruder employed had a 2.5 inch diameter and a length to diameter ratio of about 24:1. A satellite extruder was employed for the coextrusion of the hereinabove defined polymer blend. The satellite extruder comprises a conventional extruder having an extruder screw with a 1.5 inch diameter and a length to diameter ratio of about 20:1. Molten blended resin from the satellite extruder consisted of 4% by weight of the above defined medium density polyethylene and 96 wt. % of the polypropylene. The molten blend was fed into the cast film die affixed to the end of the core extruder through an adapter specifically designed to join the polymer stream from the satellite extruder to the molten polymer core stream so that it covered and encompassed the molten surface of the core layer. The coextruded multi-layer structure was extruded through a slot onto a chill roll to form a cast film of approximately 35 mils thick and 8 inches wide. This molten laminate, after extrusion was immediately quenched in a cold water bath and sequentially biaxially oriented on conventional equipment. During this process the quenched film was first reheated to approximately 290° F. and stretched in the machine direction employing differential speed rollers. The degree of machine direction stretch was 5 times. This machine direction stretched material was then fed to the transverse orienter where it was heated to about 310° F. and stretched transversely to 8 times its original width. The now biaxially oriented film was cooled, trimmed and wound into a roll. The film had excellent optical clarity and was approximately 0.85 mils in thickness. The skin layers each amounted to about 15% of the overall film thickness.

This procedure was repeated employing the skin layer blends shown in Table 1. For purpose of comparison, data regarding a film of 100% polypropylene is shown in the Table. The medium density polyethylene cannot constitute 100% of the skin layer because it is too soft and is translucent. A clear film is a commercial necessity. At percentages of about 60 to 100% MDPE or HDPE, the skin or skins are too soft and too hazy.

The skin/skin coefficient of friction data was obtained in the following manner. The coefficient of friction values referred to herein have been determined according to the procedure of ASTM D 1894-78, modified as follows: The film to film area of contact is 2 inches by 1 inch, instead of 2½ inches by 2½ inches. The mass of the sled is 100 grams rather than 200 grams and the sled speed is 6 inches per minute, the same as ASTM D 1894-78. Thus, the modified test is run at the condition of 50 grams/inches$^2$ rather than 32 grams/inches$^2$. Table 1 illustrates by way of comparison with polypropylene the dramatic reduction in COF of films with the novel MDPE-polypropylene skin blend.

TABLE 1

| Surface Layer | Skin/Skin COF |
| --- | --- |
| 100% polypropylene/0% MDPE | >1.00 |
| 96% polypropylene/4% MDPE | 0.40 |
| 94% polypropylene/6% MDPE | 0.34 |
| 92% polypropylene/8% MDPE | 0.34 |
| 67% polypropylene/33% MDPE | 0.33 |
| 33% polypropylene/67% MDPE | 0.32 |

As indicated above these films have no COF or slip agents added thereto. It is to be understood, however, that the films may contain conventional additives to further enhance COF or slip characteristics.

As indicated above the procedure of the Example was repeated employing different blends of the above-identified high density polyethylene DX 611. The results are shown in Table 2.

TABLE 2

| Surface Layer | Skin/Skin COF |
| --- | --- |
| 100% polypropylene/0% HDPE | >1.00 |
| 95% polypropylene/5% HDPE | 0.50 |
| 70% polypropylene/30% HDPE | 0.36 |
| 40% polypropylene/60% HDPE | 0.42 |

What is claimed is:

1. An oriented film structure comprising a polypropylene film having on at least one surface thereof a layer of a blend of (I) a member selected from the group consisting of a medium density polyethylene, a high density polyethylene and mixtures thereof and (II) polypropylene.

2. The structure of claim 1 wherein said blend contains from about 2-60 wt. % of said member.

3. The structure of claim 2 wherein said blend includes medium density polyethylene.

4. The structure of claim 2 wherein said blend includes high density polyethylene.

5. The structure of claim 2 wherein said blend includes a mixture of medium and high density polyethylene with polypropylene.

6. The structure of claim 2 wherein said layer is on one surface of said polypropylene film.

7. The structure of claim 2 wherein said layer is on both surfaces of said polypropylene film.

8. The structure of claim 1 wherein said blend layer has a lower coefficient of friction than said polypropylene film.

9. A method for making an oriented film structure comprising: applying to at least one surface of a polypropylene film a layer of a blend of (I) a member selected from the group consisting of a medium density polyethylene, a high density polyethylene and mixtures thereof and (II) polypropylene, bringing the combination to a stretch-orientable condition and stretching it in at least one direction.

10. The method of claim 8 wherein the blend layer is applied to the polypropylene film during coextrusion through a die followed by cooling prior to biaxial orientation.

* * * * *